May 23, 1972 R. W. LA WARRE 3,664,779
APPARATUS FOR PRODUCING SHAPES WITH CONTROLLED THREE DIMENSIONS
Filed April 1, 1969 2 Sheets-Sheet 1
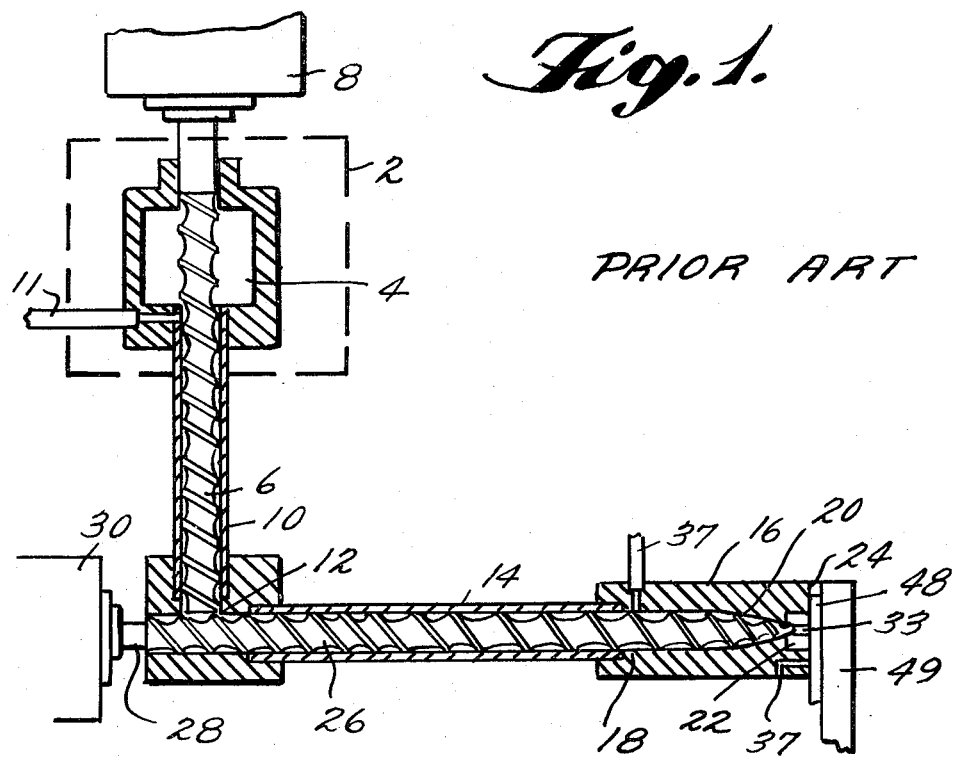
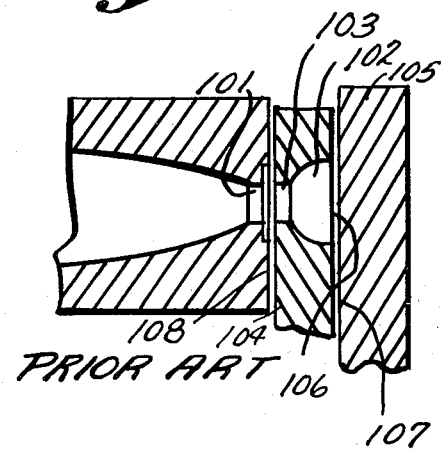
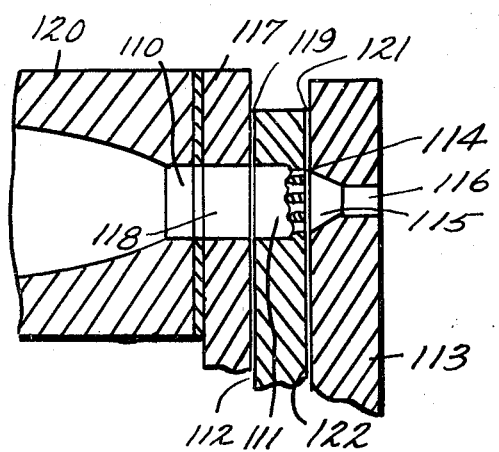
INVENTOR
ROBERT W. LaWARRE
BY Cushman, Darby & Cushman
ATTORNEYS May 23, 1972   R. W. LA WARRE   3,664,779
APPARATUS FOR PRODUCING SHAPES WITH CONTROLLED THREE DIMENSIONS
Filed April 1, 1969   2 Sheets-Sheet 2
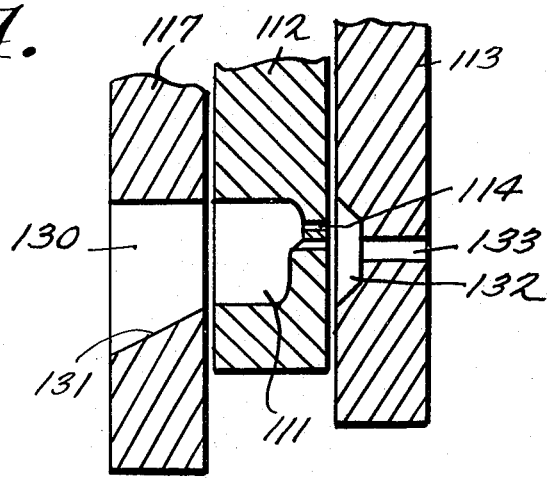
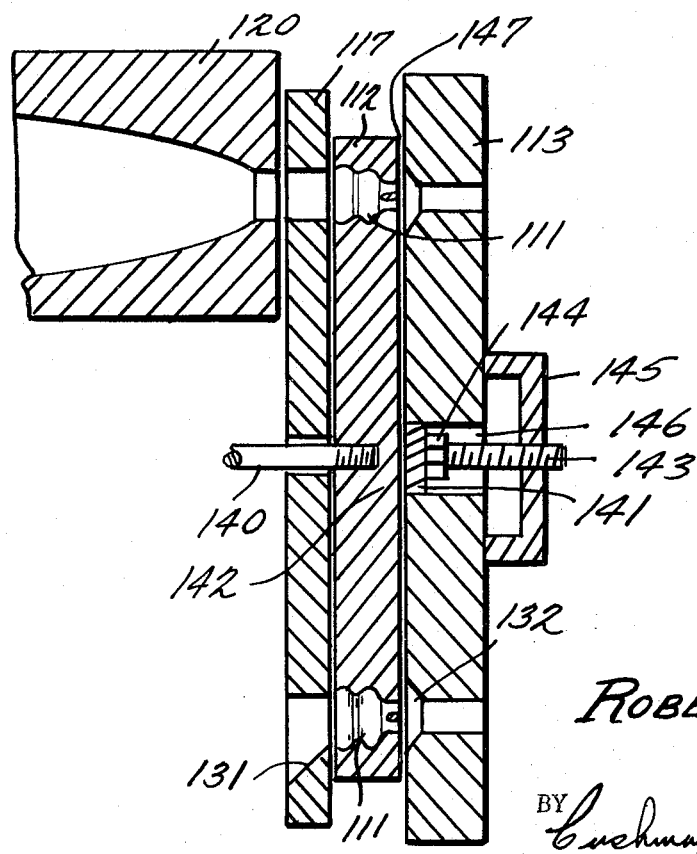
INVENTOR
ROBERT W. LaWARRE
BY Cushman, Darby & Cushman
ATTORNEYS

United States Patent Office 3,664,779
Patented May 23, 1972

3,664,779
APPARATUS FOR PRODUCING SHAPES WITH CONTROLLED THREE DIMENSIONS
Robert W. La Warre, Lima, Ohio, assignor to Beatrice Foods Co., Chicago, Ill.
Filed Apr. 1, 1969, Ser. No. 812,093
Int. Cl. B29d 27/00
U.S. Cl. 425—4
7 Claims

ABSTRACT OF THE DISCLOSURE

There is provided a process for producing expanded shaped products by feeding an expandable mass at elevated temperatures and pressures into a die having minor openings in the die opposite the major openings of the die, the latter of which being adjacent a feeding device such as an extruder. After stabilization of the expanded mass in the die, the shaped product is discharged from the die by exit through the major opening, the major opening having been moved away from the feeding device. The method and die of the invention are capable of producing shaped products which may be controlled in configuration in three dimensions.

---

This invention relates to shaped products, e.g., food products, and methods and apparatus for making the same and has particular reference to shaped food products made by the explosive expansion of a vaporizing liquid, e.g., steam in a cereal, meal or like composition.

Products made by the expansion of steam in cereal compositions have a wide market at the present time, and among these are snacks prepared generally from corn meal or the like cereals and having various flavors such as cheese flavors. These products have been formed in the shape of "curls" or irregular flakes produced by the extrusion of a cereal meal composition which has been subjected to high temperatures under high pressures and permitted to escape into the air whereupon steam therein expands producing porous products. Very little control of shape of the products was possible. The exploded products were completed for marketing by baking and then given suitable treatments as with salt, flavoring matters, or the like.

A distinct improvement over the prior art has been disclosed in U.S. Pats. 2,915,957 and 3,104,975 to Bowman. These patents disclose a method and apparatus for producing food products, as noted, but with marked improvements in the shape thereof. The shape of the products of Bowman were controllable, as opposed to the prior art where very little control was possible. The method and apparatus of Bowman were capable of producing defined shapes such as the suits of playing cards, e.g., clubs, diamonds, spades, etc., or other elaborate shapes. However, the method and apparatus of Bowman suffered from several disadvantages both in operation and the shapes of the products produced. Generally speaking, the method and apparatus presented a number of difficulties in operation, especially from the standpoint of high volume production, and the products produced have essentially only two dimensions of irregular shape, i.e., height and width. The third dimension of shape, i.e., thickness, could not be irregular to any appreciable extent because of operation difficulties inherent to the method and apparatus of Bowman.

Accordingly, it is an object of the present invention to provide a process and apparatus which is an improvement over the process and apparatus of Bowman and which allows the production of irregular, but defined and controllable shapes, in three dimensions, More specifically, the present invention resides in an improved method of forming three dimensional shaped products and a die for the production thereof which obviate the difficulties in the invention of Bowman.

Accordingly, the entire disclosures of U.S. Pats. 2,915,957 and 3,104,975 to Bowman, issued on Dec. 8, 1959, and Sept. 24, 1963, respectively, are incorporated herein by reference. It is further emphasized that the Bowman patents must be fully understood in order to completely appreciate the present invention, especially since details of the method and apparatus not directly pertinent to the present improvement will not be repeated herein. Further, at the outset, it should be understood that the particular feed and extrusion method and apparatus are not critical to the present invention and any desired feed and extrusion method and apparatus may be used so long as the feed is raised to a sufficient temperature and pressure so that the liquid content, e.g., water, of the feed is held essentially in the vapor state and is highly compressed. The foregoing is, of course, necessary, since when the feed is metered into the molding devices of the invention, the feed must explosively expand therein and fill the same. This explosive expansion gives rise to the quality and texture of the product produced, as is well known in the art. Generally speaking, the temperature and pressure under which the feed is metered into the molding device should be sufficient to increase the volume of the feed from 5 times to 10 times that of the volume of the feed prior to being metered into the molding device, and more preferably from 6 times to 9 times, e.g., 7 times. However, for purposes of illustration of the present invention, the feeding, metering, cooking and extruding devices and methods disclosed in the Bowman patents are specifically references, especially since the same are most convenient in use.

As will become evident, a large variety of cereals may be used in the practice of the invention, and these, depending upon their individual properties (e.g. moisture content, starch content, specific gravity) may require the use of varying conditions for the optimum operation of the method. To furnish a clear example of the invention reference will be hereafter confined in the description of the operation to the use of corn meal. The method and apparatus may be used, however, for the processing of other than cereal products only. For example there may be used as the material treated compositions containing starch (corn, rice, albido, wheat, potato, etc.) Shrimp or other sea food, meat, and other cellular edible mixtures.

Also, as will be appreciated, the process and apparatus may be used with non-edible feeds. Any material which may be molded by expansion in the same manner as cereal and like products can be processed with the present method and apparatus. Hence, cellular plastics which have a foamed final configuration may be used. It is only necessary that a vaporizable liquid be worked into the plastics in the same manner as with cereals so that an explosive expansion occurs during molding. For example, polystyrene, polyethylene, polypropylene, cellulose derivatives, etc., may be used with a liquid which will work into the same, e.g., a swelling liquid.

The invention will be understood with reference to the drawing where:

FIG. 1 is a partial cross section illustrating a suitable extrusion device as disclosed in the Bowman patents;

FIG. 2 is a cross section illustrating the die of the Bowman invention;

FIG. 3 is a cross section illustrating the die of the present invention;

FIG. 4 is a cross section illustrating the discharge station of the present invention; and FIG. 5 is a cross section illustrating the die assembly of the present invention.

The general operation of the process is described in connection with FIG. 1, which is a simplified diagrammatic illustration of the apparatus of FIG. 1 in the Bowman patents. This general and simplified description of the operation of the process is set out herein in order to provide background information of the process in a manner uncluttered by details which are fully disclosed in the Bowman patent but not directly pertinent to the present invention.

The corn meal in dry condition (having, for example, an inherent moisture content 8 to 10%), or with additional water added thereto, is supplied to a hopper indicated at 2 which delivers it to a chamber 4 from which it is fed through a tube indicated at 10 by means of a screw 6 driven by a motor 8. The screw 6 serves only as a conveyor and takes no appreciable part in raising the temperature of the meal or otherwise affecting the results. In accordance with the method it is desirable to admix water with the meal and this may be accomplished by feeding water in measured quantity through a connection 11 to the meal as it leaves the chamber 4 under the action of the conveyor screw. Typically, assuming an inherent moisture content in the meal as indicated above, the water may be added at the rate of four to seven quarts per hundred pounds of the meal. This water addition may be made up by premixing water with the meal, premixing part of the water with the meal and adding the remainder at 11, or by adding the entire quantity at 11. The second procedure is preferred, the amount added at 11 being in minor amount. Any feed of water is accomplished by the use of an adjustable delivery pump for the water operated by the motor 8 which drives the screw. Three motors are used for driving the various moving parts of the apparatus. These motors may be of adjustable speed types so that their speeds may be individually regulated relative to each other, or, alternatively, fixed speed motors or a single motor may be used to drive the various shafts through adjustable speed devices of well known types.

The tube 10 through which the corn meal is fed opens into a chamber 12 from which a tube 14 extends into a housing 16, the housing having a cylindrical bore portion 18 having the diameter of the bore in the tube 14, the cylindrical bore portion being followed by a conical converging bore 20 which is continued by the further converging conical bore of a hardened insert 22. The face of the member 16 is indicated at 24, and the face of the insert 22 is short by 0.001–0.002 inch of the face 24 to afford a clearance.

Extending from the chamber 12 through the bore of the tube 14 and also through the cylindrical and tapered bores indicated there is a composite screw 26 the shaft 28 of which forms a continuation thereof, being driven by a motor 30. This screw 26 typically operates at a high speed, for example, at thirty-six hundred revolutions per minute; a typical motor which is used with a tube 14 having an internal diameter of 1¼ inches develops forty horse power. The power of the motor is particularly mentioned since it is indicative of the energy which in the apparatus is transformed into heat and pressure energy in the material undergoing treatment. High speed of screw rotation is particularly effective in securing best results.

Just beyond the right-hand end of the tube 14 there are provided passages 37 for the introduction of oil and the like. The oil introduced is a cooking oil such as peanut oil, corn oil, or the like, which typically may be supplied at a metered rate of about four quarts per hundred pounds of meal; the oil pump being driven from the motor 8. This oil is desirable not only for the attainment of the most desirable product but for the lubrication in the region to the right of its point of entry, particularly the lubrication of disc 48.

The disc 48 and end cover plate 49, shown broken away in FIG. 1, form the die for expanding and molding the products. The present invention resides in a particular die and the method of operation.

As fully explained in the Bowman patents, disc 48 is in a circular shape and supported by clamping attachments connected to the frame of the extruder. The disc is rotated about its axis by a drive means, of variable speed. The disc is so positioned that the outer portion thereof, near the periphery, is adjacent the extruder discharge. The disc has a plurality of molding cavities, i.e. dies, therein along the outer portion thereof which are serially in registry with the extruder discharge. Accordingly, as the disc is rotated, successive molding cavities come into registry with the extruder discharge and are filled with a metered amount of meal. The metering is accomplished by the speed of rotation of the disc, i.e., the amount of time any one cavity (die) is in registry with the extruder discharge. At an unloading station, approximately ¾ of the circumference of the disc from the extruder discharge, the product is expelled from the cavities in the disc by means of a compressed air blast and a knife. During the time required for any one cavity to be rotated from the extruder discharge to unloading station, e.g., at least 0.10 to 0.20 second, the expanded meal stabilizes in shape and may be unloaded from the disc without damage thereto.

Bowman discloses that the cavities (dies) of the disc are of constant cross section through the thickness of the disc, but this is not necessarily the case since they may be of semi-convex shape with minor openings adjacent to the extruder orifice which are smaller than the major openings to the discharge side of the die. The shape must, of course, be such that ejection may occur. As examples, the dies may be shaped to provide products in the form of half peanuts or almonds, wafers convex or concave on one side, etc. In other words, Bowman discloses that a partial three-dimensional shape may be produced by a certain arrangement of the cavity (die) in the disc. This arrangement is illustrated in FIG. 2 where the extruder discharge 101 is in register with die cavity 102 by means of a minor opening 103 in the disc 104. The die cavity is, of course, closed by the end cover plate 105. As noted in Bowman, the minor openings (duct 103) to the feed passage (extruder orifice 101) must be smaller than the major opening (opening of die cavity 106) to the discharge side of the disc (disc 104). With the arrangement of Bowman, it was discovered, that the cross sectional area of the minor opening (or ducts) 103 must be so large that the cross sectional area required was almost as large as the cross sectional area of the die cavity itself. If the minor opening cross sectional area was substantially less than the major opening cross sectional area, i.e. that die cavity, one of three unacceptable results occurred. If the disc was revolved at normal production speeds, the die cavities were not sufficiently filled, since the restricting cross sectional area of the minor opening prevented a sufficient amount of meal from entering the die cavity through the opening in the time when the die cavity was in register with the extruder orifice. This resulted either in a product of poor quality and/or poor shape. If the rotation of the disc were slowed enough to allow sufficient time for the die cavity to remain in register with the extruder orifice so that a sufficient amount of meal entered, the production rate was so seriously reduced that it was completely unacceptable. Also, if the cross sectional area of the minor opening was increased sufficiently to allow filling of the die cavity at normal production speeds, the cross sectional area of the minor opening was substantially the same as the cross sectional area of the major opening, i.e. the die cavity, and hence negated the three-dimensional shapes.

Under the circumstance, it was attempted to obviate these difficulties by providing increased clearance between the disc and end cover plate and by creating a vacuum in the die cavity as disclosed by Bowman as features of the invention. Theoretically, a vacuum in the die cavity should allow more meal to pass through the ducts in a given time. Similarly, increased clearance between the disc and end cover plate should allow the air in the die cavity to escape more freely, reduce back pressure and accordingly pass more meal through the duct in a given time. However, the vacuum that could be created did not substantially improve performance, since the seal between the disc and the end cover plate was not good enough to maintain a sufficiently high vacuum. Increasing the clearance 107 between the disc 104 and the end cover plate 105 to allow the air in the die cavity to escape more freely proved unsatisfactory, since an increase in clearance sufficient to substantially effect the flow of meal through the duct also allowed meal to pass from the die cavity into the clearance 107 and plug the disc to the end cover plate. Also, a proper clearance could not be maintained because the pressure of the extruder pushed the disc 104 against the end cover plate 105 and effectively closed the clearance 107 especially when no die cavity was in register with the extruder orifice, and opened clearance 108 causing mechanical difficulties.

Accordingly, the process and apparatus of Bowman works well with two dimensional shapes, but is arbitrarily unacceptable for three-dimensional shapes. In this connection, it should be understood, as used herein, that two dimensional shapes refer to those shapes which have configurations in the height and width which may be varied at will and are controllable, while three-dimensional shapes have configurations in height, width and depth which may be varied at will and are controllable.

According to the present invention, three-dimensional shapes may be easily produced. The general apparatus and process of Bowman may be used so long as the following improvement is practiced. Hence, in the present improvement, the heated and pressured expandable mass is fed from the extruder orifice into a substantially closed die adjacent the orifice, which die has a major opening on the side of the die adjacent the extruder orifice and at least one minor opening on the opposite side of the die. By this method and arrangement, the gases contained in the die are pushed toward the minor opening by action of the mass advancing into and expanding in the die and discharged through the minor openings. The die is maintained in a substantially closed condition until the mass has expanded and substantially stabilized in shape. Thereafter, the die is opened in the major opening side and the stabilized and expanded mass is discharged from the die through the major opening which was adjacent the extruder orifice during the feeding step and a controllable, three-dimensional, expanded and molded mass is obtained. This is directly opposite to Bowman and unexpectedly results in three-dimensional shapes which could not be obtained by the method and apparatus of Bowman.

The present improvement, is illustrated in FIG. 3, where 110 is the extruder orifice, 111 is the die cavity, 112 is the disc, 113 is the end cover plate. As can be seen from the figure, the extruder orifice 110 is in direct register with the die cavity 111, in reversed arrangement of that Bowman. While the die cavity is shown as the same size as the extruder discharge, this is, of course, not necessary, but merely illustrates the direct communication between the extruder discharge and the die cavity. In the die cavity 111 and in juxtaposition to side 122 of end cover plate 113, there are plurality of minor opnings (ducts) 114. These ducts are, in turn, in register with a recess 115 which communicates through end plate 113 to the outside at opening 116. Hence, the heated meal under extruder pressure passes directly into die cavity 111 without meeting any restricting orifices or the like and the time necessary to fill a cavity is greatly reduced. The duct 114 allow the air in the cavity to be pushed out of the cavity in front of the advancing and expanding meal. Since the viscosity of air (and/or steam) is a great deal less than the meal, the air can be rapidly expelled through the ducts into recess 115 and to the atmosphere via opening 116. If desired, the opening 116 may be in communication with a vacuum source to further speed the filling of the die cavity. The relative size and length of the ducts, in connection with relative size of the die cavity are so chosen that substantiallyy no meal will pass through the ducts. As will be appreciated, the viscous meal will encounter substantial flow resistance in the relatively small and elongated minor opening (ducts). Hence, when the die cavity is in register with the extruder discharge, the amount of meal flowing into the ducts will be quite small in contrast to the large area encountered in Bowman at orifice 103. Even if meal flows through the ducts, it is of no consequence since the meal flashed around the ducts on the side thereof adjacent the end cover plate are sheared away by the walls of the recess 115 and discharged through opening 116, leaving only a flash corresponding to the ducts 114 on the formed product, which small flashes are broken away during discharge from the die cavity (as hereinafter discussed) or during handling of the product prior to packaging. In any event, by correctly choosing the size and/or length of the ducts and the number thereof, significant flashes are all but entirely eliminated. In this regard, as the viscosity of the meal increases, the cross sectional area of the ducts may also be increased without obtaining significant flashes, and vice versa. However, generally speaking, for each cubic inch of die cavity volume, the total cross sectional area of the ducts should be from about .0002 to .0015 square inch. This total cross sectional area of the ducts may be equally or non-equally divided among the number of ducts used. For very irregular shapes, a number of ducts, e.g., up to 25 may be used and for simple shapes, only 1 duct or up to 10, e.g., up to 4 or 5 may be used. In any event, the cross sectional area of the ducts will be small compared with the greatest cross sectional area of die cavity, e.g., .0001" to .050" thereof. Of course the exact size of the ducts will depend to some extent on the length of the ducts, as will be readily appreciated, i.e. the longer the ducts the smaller the cross sectional area of the ducts. The above ranges are, however, quite satisfactory for ducts up to 1 inch or more in length, e.g. from 1/64 to 1½ inches in length.

As will be appreciated, since the major opening of the die cavity of the present invention is toward the extruder orifice and not the end cover plate, as in Bowman, it is optional to provide a stationary extruder plate 117 (as will be more fully discussed hereinafter). If the plate 117 is used, the meal simply passes through the aperture 118 into the die cavity. When the die cavity moves out of register with the extruder discharge and the aperture 118 of extruder plate 117, the die cavity is closed by the extruder plate. Of course, there must be running clearance 119 between the stationary extruder plate 117 and disc 112, as well as a clearance 121 between rotating disc 112 and the stationary end cover plate 113. Suitably, the clearances are between about 0.0003 and 0.05 inch.

As noted above, an extruder plate is not necessary for many applications and only a partial extruder plate will be needed. As can be appreciated from the above, the die cavity must remain essentially closed for only enough time for the expanding meal to stabilize in shape. Under many operational conditions and with many meals, this time is quite short. Accordingly, in the absence of an extruder plate 117, the major opening of die 111 in disc 112 will be immediately adjacent to the extruder head 120 (see FIG. 5), and a portion of the extruder head may serve to close off the die cavity for a time period sufficient for the expanded meal in the die cavity to stabilize. Of course, if no extruder plate is used, there must be a running clearance between disc 112 and extruder head 120. Alternately a partial extruder plate may be used, e.g. a semi-circular plate or a ⅓ or ¼ of a circular plate. In other words, the extruder plate need cover only that portion of disc 112 necessary to allow sufficient stabilization time for the meal in die cavity 111 to expand and stabilize.

Also in connection with the end cover plate and similarly to the disclosure above regarding the extruder plate, it is not necessary that the end cover plate by a full plate.

A partial plate will be quite satisfactory. It is only necessary that there be a recess 132 for supplying a fluid pressure to the die cavity 111 for ejecting the product at the discharge station. Accordingly, the end cover plate could be eliminated and a simple fluid pressure distributing enclosure adjacent to the discharge station could be used. However, when a vacuum is to be used in connection with the filling of the die cavity with meal, it will be necessary to also provide a vacuum distributing enclosure adjacent the die cavity when the die cavity is in registry with the extruder discharge. However, the preferred embodiment, especially when vacuum is used in filling the die cavities, is to have a full end cover plate or at least a partial end cover plate with the recess therein as noted above and with support means, e.g. spokes, between the outer partial portion of the plate and the thrust bearing area. In this regard end cover plate 113 of FIG. 5 could be viewed in cross section through the outer partial end cover plate (the portions near recess 115 and recess 132) and through a spoke connecting the same with the disclosed thrust bearing 141 therein.

After the die cavity is filled, it is rotated to a discharge station and the molded and stabilized product discharged in a manner similar to that disclosed by Bowman. However, the discharge station of the present invention differs from Bowman and is shown in FIG. 4, where 117 is the extruder plate, 112 is the die containing disc, 113 is the end cover plate, 111 is the die cavity and 114 are the minor openings (ducts). At the discharge station, the die cavity comes in to register with a discharge port 130 in extruder plate 117, which port is at least equal in size to that of the die cavity. The discharge port may have one wall or more thereof forming a knife edge 131, but this is not necessary. Also, as noted above, an extruder plate or a full circular extruder plate is not always necessary and hence the discharge port is accordingly optional. Opposite the discharge port and in the end cover plate 113 is a recess 132 of substantially the same or greater size than the die cavity. Communicating with the recess is an opening 133 through which a compressed fluid, e.g., air, nitrogen (or other inert gases), water, oil, etc., is passed to eject the formed and stabilized product. Suitably, the fluid pressure is up to 150 p.s.i.g., e.g., from 15 to 100 p.s.i.g. The fluid may be controlled by any suitable means, such as a solenoid valve or in a manner disclosed in Bowman. Optionally, the fluid pressure may continuously exist in recess 132 and will, of course, act against a formed product only when a die cavity comes into register with the recess.

As noted earlier in connection with Bowman, a satisfactory vacuum could not be maintained therein due to an insufficient seal between the disc and end cover plate. As a further feature of the invention, there is provided an arrangement for obtaining a satisfactory vacuum for use with filling the die cavity, if desired. This arrangement is shown in FIG. 5, where 120 is the extruder head, 117 is the extruder plate or orifice plate (optional), 112 is the disc, 113 is the end cover plate, 111 denotes the die cavities, 132 is the recess and 131 is the knife edge (optional). Passing through the extruder plate (orifice plate) 117 is a drive shaft 140 and attached to disc 112 for revolving the same. The drive shaft is attached at the other end to a power source, not shown, such as a motor or drive belt. Abutting the central portion of disc 112 is a thrust bearing 141, suitably of the roller or needle bearing type. The thrust bearing is pressed against a hardened and ground center portion 142 of disc 112, the area of which hardened and ground portion is at least equal to that of the thrust bearing pressed thereagainst. The thrust bearing is held in place by a thread shaft 143 and a lock nut 144 and pressure is applied to the thrust bearing by threadedly engagement of shaft 143 with strain frame 145. The thrust bearing is received in end cover plate 113 by means of the aperture 146 and is slidably fitted therein so that the clearance 147 between end cover plate 113 and disc 112 may be adjusted by screwing shaft 143 in and out of strain frame 145. A suitable clearance, 147, is between 0.0003 and 0.05 inch and in the clearance is placed food grade oil or grease. The oil or grease in such a clearance effectively acts as a seal and allows a satisfactory vacuum to be created in the die cavity adjacent the extruder discharge. The oil or grease may be placed in the clearance in a manner described by Bowman or may be placed therein by any suitable dispensing means, e.g. a grease cap, oil spray, oil wick. It is only necessary that the oil or grease be in clearance 147.

Of course, end cover plate 113 and orifice plate 117 are attached to the extruder by ny suitable means, but the end cover plate 113 must be adjustably attached in order to allow for adjustment of clearance 147. A clamping device for this purpose, as shown in Bowman, is quite suitable in this regard.

What is claimed is:

1. In an apparatus for producing dimensionally controlled shapes of expanded products comprising in combination a means for feeding through an orifice a heated and pressurized expandable mass, at least one die having a die cavity, said die cavity having a major opening on the side of the die cavity adjacent the orifice and at least one duct on the opposite side of the die cavity for discharging from the die cavity gases which are displaced by the said mass being fed and expanded in said die cavity, an extruder plate positioned between the said orifice and the said major opening of the die cavity, said extruder plate having an aperture in registry with the said orifice and said extruder plate functioning to substantially close said major opening after said expandable mass is fed into the die cavity, means for opening said major opening after the said mass has been expanded, molded and stabilized, and discharge means for expelling the expanded, molded and stabilized mass from said die cavity through said major opening, said duct having a cross sectional area which is small compared with the cross sectional area of the major opening.

2. The apparatus of claim 1 wherein said die cavity is contained in a rotatable disc and said die cavity is sequentially registrable with said orifice and said discharge means, said discharge means acting through said ducts to expel the expanded, molded and stabilized mass.

3. The apparatus of claim 2 wherein an end cover plate for said die cavity is positioned adjacent said duct.

4. The apparatus of claim 3 wherein a thrust bearing is pressed against said rotatable disc which contains a plurality of the said die cavities, said thrust bearing being held in place by means attached to the end cover plate.

5. The apparatus of claim 3 wherein said end cover plate has a recessed opening for communication with said duct.

6. The apparatus of claim 5 wherein said recessed opening communicates with a vacuum source when said mass is fed into the die cavity.

7. The apparatus of claim 6 wherein said end cover plate is substantially the same shape as said disc and a fluid pressure source for communication through an opening in said end cover plate acts through said ducts to expel the expanded, molded and stabilized mass.

References Cited
UNITED STATES PATENTS

| | | | |
|---|---|---|---|
| 2,915,957 | 12/1959 | Bowman | 99—238 PD |
| 3,355,765 | 12/1967 | Hendry | 18—12 DR |
| 2,525,135 | 10/1950 | Huff | 18—21 |
| 810,193 | 1/1906 | Daum | 25—9 |

J. SPENCER OVERHOLSER, Primary Examiner

N. E. LEHRER, Assistant Examiner

U.S. Cl. X.R.

18—5 P, 20 H; 99—238; 264—51; 425—817, 205, 376